United States Patent
Klassen et al.

(10) Patent No.: US 6,488,356 B1
(45) Date of Patent: Dec. 3, 2002

(54) BIDIRECTIONAL COLOR INK JET PRINTING WITH HEAD SIGNATURE REDUCTION

(75) Inventors: R. Victor Klassen, Webster, NY (US); Steven J. Harrington, Holley, NY (US)

(73) Assignee: Xerox Corporation, Stamford, CT (US)

( * ) Notice: Subject to any disclaimer, the term of this patent is extended or adjusted under 35 U.S.C. 154(b) by 1164 days.

(21) Appl. No.: 08/798,448

(22) Filed: Feb. 10, 1997

Related U.S. Application Data

(63) Continuation of application No. 08/208,556, filed on Mar. 10, 1994, now abandoned.

(51) Int. Cl.$^7$ ................................................. B41J 2/21
(52) U.S. Cl. .......................................... 347/41; 347/43
(58) Field of Search ....................... 347/43, 41; 358/502

(56) References Cited

U.S. PATENT DOCUMENTS

| | | | | |
|---|---|---|---|---|
| 4,533,928 A | * | 8/1985 | Sugiura et al. ........... | 347/43 X |
| 4,631,548 A | * | 12/1986 | Milbrandt ................. | 347/43 X |
| 4,638,337 A | | 1/1987 | Torpey et al. | |
| 4,748,453 A | | 5/1988 | Lin et al. | |
| 4,967,203 A | | 10/1990 | Doan et al. ................ | 347/41 |
| 4,999,646 A | | 3/1991 | Trask | |
| 5,353,387 A | * | 10/1994 | Petschik et al. ........... | 347/43 X |

FOREIGN PATENT DOCUMENTS

| | | |
|---|---|---|
| EP | 0546853 | 6/1993 |
| EP | 0578434 | 1/1994 |

* cited by examiner

*Primary Examiner*—John Barlow
*Assistant Examiner*—Julian Huffman
(74) *Attorney, Agent, or Firm*—Mark Costello; Christopher D. Wait

(57) ABSTRACT

A method and apparatus for operating a color ink jet printer of the type which prints a swath of the image at a time with each transit across a sheet. An image may be optionally preprocessed with undercolor removal, so that each color pixel in the image is defined by black and, at most, two colored inks. Color will be deposited to print the image on forward and return transits of a multiple color printhead across a sheet. The colors and location printed in each transit are determined prior to the first transit, by determining first, which colors may be printed in the second transit irrespective of their order of deposit. The result of this determination is logically ANDed with a checkerboard pattern to determine printing locations. Then, the other required colors and locations for the image which will not be printed with the second transit are printed on a first transit. Each swath is printed with forward and reverse transits, with checkerboarding of the reverse transit to prevent head signature artifacts. During each transit, relative motion between the sheet and printhead advances printing down the page by one half swath increments.

22 Claims, 3 Drawing Sheets

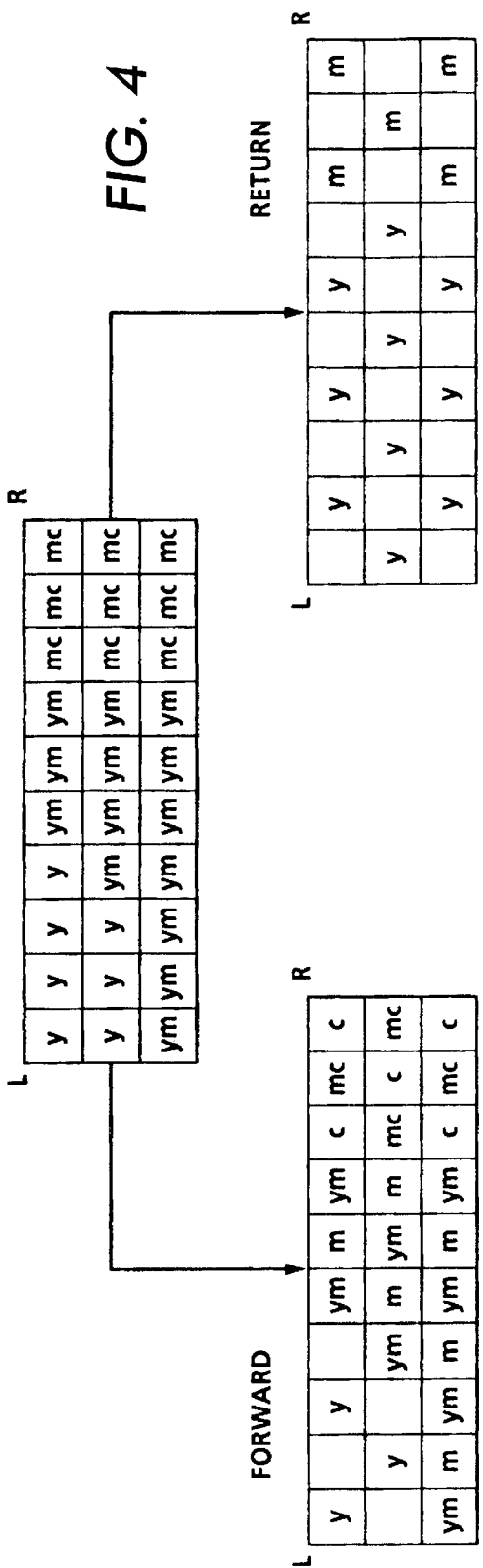

BIDIRECTIONAL COLOR INK JET PRINTING WITH HEAD SIGNATURE REDUCTION

This application is a continuation of application Ser. No. 08/208,556, filed Mar. 10, 1994, now abandoned.

This invention relates to drop-on-demand ink jet printing systems and more particularly, to a multi-color thermal ink jet printer adaptable to print in bidirectional swaths.

BACKGROUND OF THE INVENTION

Color in documents is the result of combination of a limited set of colors over a small area, in densities selected to integrate to a desired color response. This is accomplished in many printing devices by reproducing separations of the image, where each separation provides varying density of a single primary color. When combined together with other separations, the result is a full color image.

Thermal ink jet printing is generally a drop-on-demand type of ink printing system which uses thermal energy to produce a vapor bubble in an ink filled channel that expels a droplet. A thermal energy generator or heating element, usually a resistor, is located in the channels near the nozzle a predetermined distance therefrom. The resistors are individually addressed with an electric pulse to momentarily vaporize the ink and form a bubble which expels an ink droplet. As the bubble grows, the ink bulges from the nozzle and is contained by the surface tension of the ink. As the bubble begins to collapse, the ink in the channel between the nozzle and the bubble starts to move toward the collapsing bubble, causing a volumetric contraction of the ink at the nozzle and resulting in separation of the bulging ink as a droplet. The acceleration of the ink out of the nozzle while the bubble is growing provides the momentum of the droplet which proceeds in a substantially straight line towards a recording medium, such as paper or transparencies, etc. (hereinafter, referred to as a "sheet"). Sheets are moved past the printhead for creation of the image. Further details with respect to thermal ink jet printing devices are available at U.S. Pat. No. 4,638,337 to Torpey et al., and U.S. Pat. No. 5,422,664 entitled, "Method and Apparatus for Maintaining Constant Drop Size Mass in Thermal Ink Jet Printers," by J. Stephany which illustrate a multi-color ink jet printer.

In one type of ink jet device, a printhead including an array of several nozzles oriented parallel to the direction of sheet travel is moved across the recording medium in a direction perpendicular to the direction of sheet travel. Each transit prints a swath of spots or pixels across the page corresponding to an image. Most thermal ink jet printers print some number of scanlines in a swath, and the swath boundaries are visible in prints made thereby. The boundaries are visible because of ink flowing beyond the boundary of the array end (in the case of paper) or pulling away from the boundary of the array end due to surface tension (in the case of transparencies). In the former case a thin line along the boundary is more heavily inked; in the latter it is not inked at all.

It will be clear from the above description that printing can be accomplished in each transit of the head across the page, and for high speed black (or monocolor) only printing, bidirectional printing is common. Color ink jet printing is normally performed unidirectionally (left to right or right to left, not both). Multiple nozzle arrays arranged in parallel may be provided to print with multiple inks printing plural separations. One particular type of color ink jet printer has a single head (corresponding to an array of nozzles) per color, with four heads mounted one behind the other on the carriage, so that all four colors cyan, magenta, yellow and black of all scanlines in a swath are printed in a single pass, with a fixed order for the separations within a pixel. The reason bidirectional printing is normally avoided is that when the carriage is moving in reverse the colors are printed in reverse order. Printing a cyan pixel on a magenta pixel generally gives a different color from that when the printing order is reversed.

U.S. Pat. No. 4,999,646 to Trask discloses a unidirectional printing system, in which, to correct the interswath boundary artifact, a multiple pass complementary dot pattern ink jet printing process for enhancing the uniformity and consistency of dot (drop) formation during color ink jet printing is provided. Such enhancement in turn directly affects and improves the total print quality over a color printed area by minimizing the undesirable characteristics of coalescence, beading, hue shift, bending, cockling and color bleed when printing on both transparencies and plain or special papers. Using this process, successive printed swaths are made by depositing first and second partially overlapping complementary dot patterns on a print media. Simultaneously, the dot spacing in coincident dot rows within the overlapping portions of the dot patterns is alternated between dots in the first pattern and dots in the second pattern. Also note U.S. Pat. No. 4,748,453 to Lin et al. Various commercial products from Hewlett Packard Company, Palo Alto, Calif., including the HP500C, HP 550C and HPXL300 ink jet printers are believed to use a head signature mitigation pattern.

References disclosed herein are incorporated by reference for their teachings.

SUMMARY OF THE INVENTION

The present invention is directed to a method of using a color ink jet printer of the type which prints a swath of the image at a time with each transit across a sheet to print color images with a substantially reduced bidirectional printing artifact.

In accordance with one aspect of the invention there are provided method and apparatus for operating a color ink jet printer of the type which prints a swath of the image at a time with each transit across a sheet. An image may be optionally preprocessed with full undercolor removal, so that each color pixel in the image is defined by black and only two colored inks. Color will be deposited to print the image on forward and return transits of a four color printhead across a sheet. The colors and location printed in each transit are determined prior to the first transit, by determining first, which colors may be printed in the second transit irrespective of their order of deposit. The result of this determination is logically ANDed with a checkerboard pattern to determine printing locations. Then, the other required colors and locations for the image which will not be printed with the second transit are printed on a first transit. Each swath is printed with forward and reverse transits, with checkerboarding of the reverse transit to prevent head signature artifacts.

If only one color is printed, it can be done in a checkerboard fashion, with one parity of the checkerboard on the first pass, and the other on the second pass. If two colors are printed in one pixel, one of them is normally printed first. In the unidirectional mode this is totally specified; whichever color is printed first in unidirectional printing should be printed in the first pass for bidirectional printing. The second color can be checkerboarded, printing half in each pass.

If printing order KCMY is used for right-to-left printing on the printer, let X be a bitmap representing the checkerboard, and let C, M, Y and K be bitmaps representing the input. The first pass is derived from the second pass. For the second pass:

$$K_{2LR} = K \wedge X$$
$$C_{2LR} = C \wedge \neg(M \vee Y) \wedge X$$
$$M_{2LR} = M \wedge \neg Y \wedge X$$
$$Y_{2LR} = Y \wedge X$$

The subscript LR emphasizes that the direction of travel is left to right. The symbols $\wedge$, $\vee$ and $\neg$ indicate the logical operations of AND, OR and NOT respectively. Then for the first pass, $$K_{1RL} = K \wedge \neg K_{2LR}$$
$$C_{1RL} = C \wedge \neg C_{2LR}$$
$$M_{1RL} = M \wedge \neg M_{2LR}$$
$$Y_{1RL} = Y \wedge \neg Y_{2LR}$$

In the described manner, correct color printing can be accomplished with bidirectional printing, and with checkerboard prevention of head signature artifacts.

A more complete understanding of the present invention can be obtained by considering the following detailed description in conjunction with the accompanying drawings in which:

FIG. 4 illustrates the composition of each swath bitmap from the bitmap describing an image; and FIG. 5 illustrates the arrangement of the swaths preferably used to form an image.

DESCRIPTION OF THE PREFERRED EMBODIMENT

Figure 1:
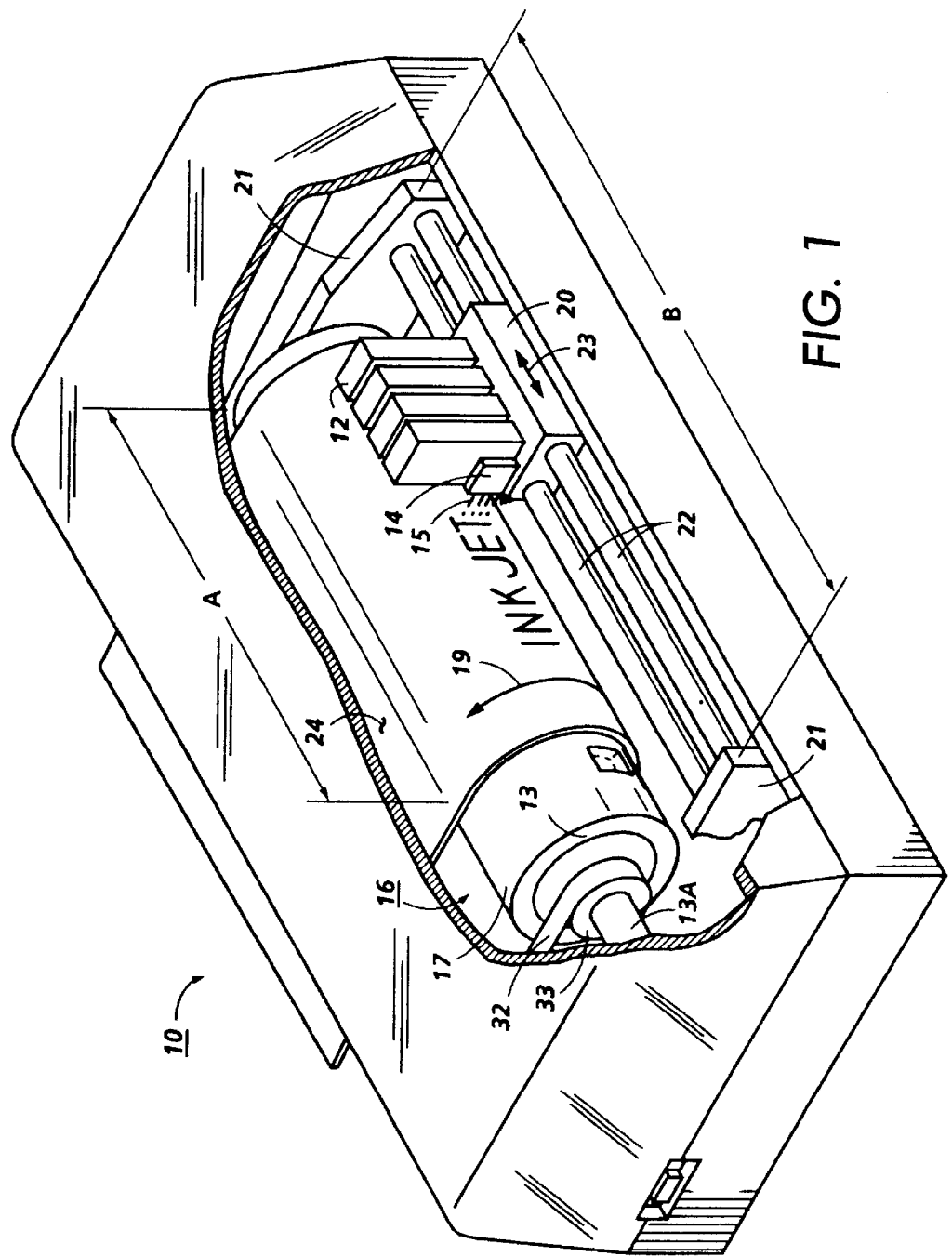
FIG. 1 is a schematic isometric view of a multi-color, carriage type, thermal ink jet printer containing the present invention printing plural separations in swaths across a sheet supported on a platen.

With reference now to the drawings, where the showings are for the purpose of illustrating an embodiment of the invention and not for limiting same, in FIG. 1, a multi-color thermal ink jet printer 10 is shown containing several disposable ink supply cartridges 12, each with an integrally attached printhead 14. The ink cartridge and printhead combination are removably mounted on a translatable carriage 20. During the printing mode, the carriage reciprocates back and forth on, for example guide rails 22, parallel to the recording medium or sheet 24 as depicted by arrow 23. The end-to-end travel distance of the carriage and printheads is shown as distance B. The carriage is driven back and forth across the length of a cylindrical platen 16 by well known means such as, for example, by cable and pulley with a reversible motor (not shown). A recording medium such as, for example, paper is mounted to platen 16. The platen has a diameter of between 10 and 20 cm and is constructed, for example, out of aluminum sleeve 17 with end caps 13 containing a shaft 13A there through which has a pulley 33 mounted on one end and driven via a stepper motor (not shown) by belt 32. The platen is rotatably mounted in frame sides 21 which also contain the ends of guide rails 22. The paper is held stationary by the platen while the carriage is moving in one direction. Prior to the carriage moving in the reverse direction, the paper is stepped by the platen in the direction of arrow 19 a distance printed thereon by the printheads 14 during transversal in one direction across the paper. The width of the sheet is the printing zone or during the carriage transit and is indicated as distance A. To enable printing by all of the plurality of printheads and to accommodate printhead priming and maintenance stations (not shown), the overall travel distance B is larger than the printing region A. Thus, an encoder (not shown) must be used to monitor the position of the carriage 20 when the printheads are in the printing region. Droplets are ejected on demand from nozzles (not shown) located in the front faces (not shown) of the printheads along the trajectories 15 to the sheet. The front face of the printhead is spaced from the sheet a distance of between 0.01 and 0.1 inch, with the preferred distance being about 0.02 inches. The stepping tolerance of the platen drum 16, the sheet, and the linear deviation of the printheads are held within acceptable limits to permit contiguous swaths of information to be printed without gaps or overlaps.

Each cartridge 12 contains a different ink, typically one black and one or more cartridges of different selected colors. The combined cartridge and printhead is removed and discarded after the ink supply in the cartridge has been depleted. In this environment, some of the nozzles do not eject droplets during one complete carriage traversal and generally, none of the nozzles eject droplets as the printheads move beyond the edge of the platen. While at this end of the carriage transit, there is a small dwell time while the platen drum is being stepped one swath in height in the direction of arrow 19. A maintenance and priming station (not shown) is located on one side of the platen drum where the lesser used nozzles may fire nozzle-clearing droplets, and/or where the nozzles may be capped to prevent them from drying out during idle time when the printer is not being used.

Figure 2:
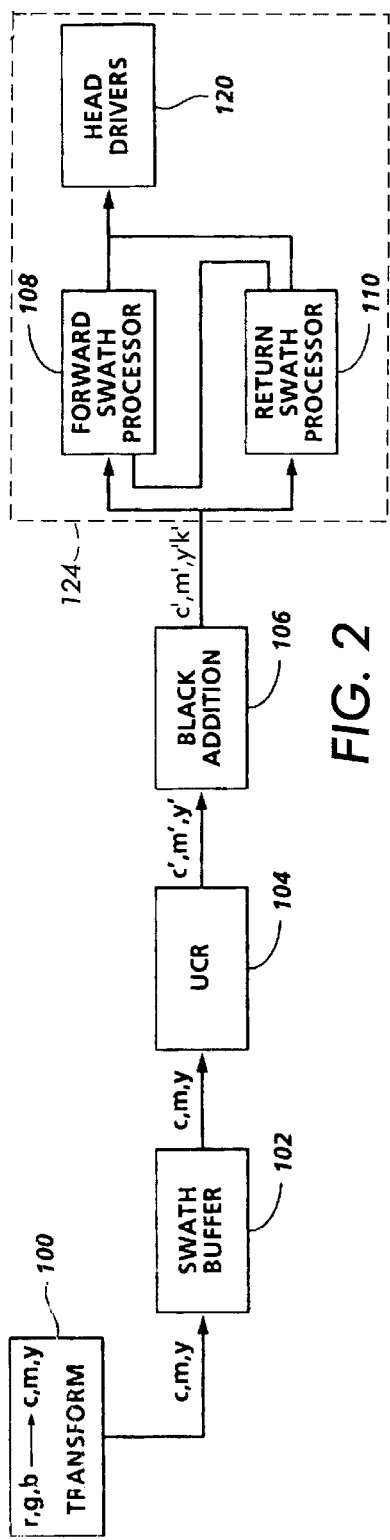
FIG. 2 is a schematic block diagram illustrating the control arrangement of an ink jet printer operating in accordance with the present invention.

With reference now to FIG. 2, a highly schematic system overview is presented. Typically, images to be printed are initially described in terms of device independent color coordinates r, g, b (colorimetric red, green and blue). Color descriptions expressed in terms of r, g, b color coordinates are converted to device dependent colorant descriptions at RGB to CMYK transform 100, to produce colorant signals defined in terms of cyan, magenta, yellow and black colorants. A portion of the image may be conveniently stored at swath buffer 102, which may store a number of scan lines corresponding to a swath of the image to be printed in forward and return transits of the printhead past the sheet, as will be further described below. The conversion from RGB to CMYK may include undercolor removal and black addition. UCR 104 provides undercolor removal in the image, removing equivalent densities of colorants to the greatest extent possible, so that any color is described for printing purposes by only two colorant signals. At black addition 106, black signal K is added to the colorant signals, in an amount related to the amount of undercolor removal. Now, any color in the image is described by only two colorants.

As noted, the printhead reciprocates back and forth parallel to the sheet allowing printing of swaths on each transit of the sheet. There are two transits: a forward or first transit (commonly, although not necessarily, from right to left) and a return or second transit (commonly left to right). Accordingly, provided are forward swath processor 108 and return swath processor 110, each of which process the swath directed thereto, to produce image data for head drivers 120 to drive the printheads for printing during a corresponding transit. It will be noted that the output of return swath processor 110 is provided as an input to forward swath processor 108 as will be explained hereinafter. Together, processors 108, 110 and head drivers 120 comprise controller 124 for the printer.

Figure 3A:
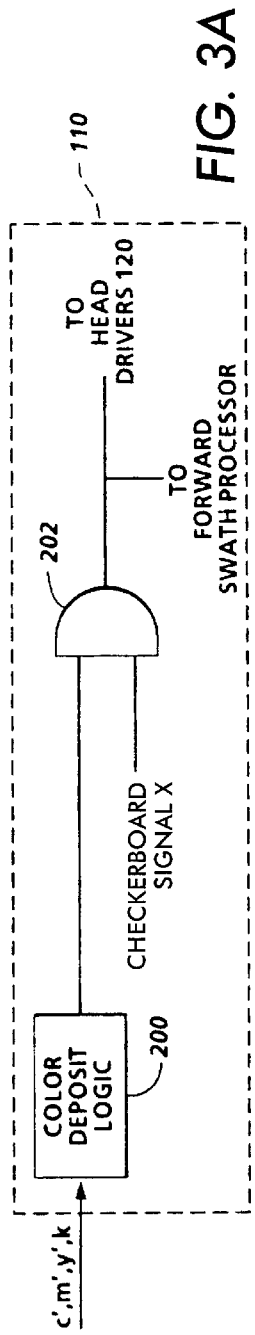
FIGS. 3A and FIG. 3B illustrate swath processors in the control arrangement of FIG. 2.
Figure 3B:
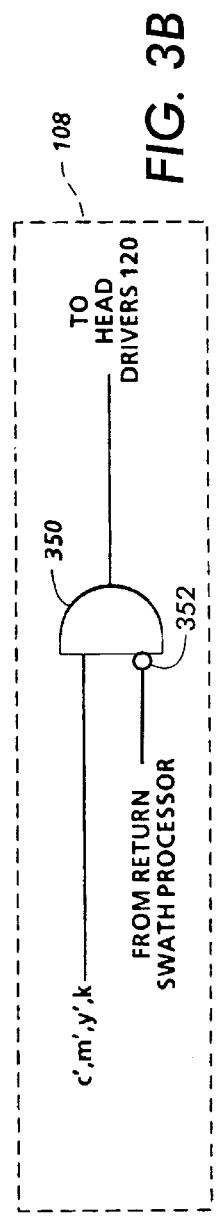

With reference now to FIG. 3A, return swath processor 110 includes color deposit logic 200 and AND gate 202. Color deposit logic 200 has as an input the four color signals C, M, Y, K and determines which colors may be printed in the return transit irrespective of their order of deposit. AND gate 202 logically ANDs the output of color deposit logic 200 with a signal X representing a checkerboard pattern. As used herein, a checkerboard pattern refers to a head signature mitigation signal which represents a series of alternately ON and OFF signals, where each line of the signal is offset by one signal place from the previous line. The resultant signal, if it were printed, would look like a checkerboard. Variations of the checkerboard pattern are possible, which tend to retain the relative relationship of ON signals to OFF signals, and which intermix the ON and OFF signals by position for head signature mitigation. The checkerboard pattern is used, as described in U.S. Pat. No. 4,999,646 to Trask, to reduce artifacts usually noted at swath boundaries.

The purpose of printing the second pass pixels in a checkerboard is to minimize head signature. In order to maximize the effectiveness of printing with this pattern, it is desirable to print every pixel in the second-pass half of the checkerboard, as long as a color shift will not be produced as a result of laying down inks in a different order from the order in which they are printed in the first (forward) pass.

Suppose order KCMY (K is the first deposited lowest possible layer, and Y is the last or highest possible layer, with respect to the sheet, on the forward transit) is used for right-to-left printing on the printer, and X is a bitmap checkerboard pattern signal, and C, M, Y and K are separation bitmap signals representing the image. For the return or second pass, $$K_{2LR} = K \wedge X$$
$$C_{2LR} = C \wedge \neg(M \vee Y) \wedge X$$
$$M_{2LR} = M \wedge \neg Y \wedge X$$
$$Y_{2LR} = Y \wedge X$$

The subscript LR emphasizes that the direction of transit is left to right, and the symbols $\wedge$ and $\neg$ represent a logical AND and NOT process respectively, while the symbol $\vee$ represents a logical OR process. It is desired that the inks to go down in the order of the forward pass. (Any other ordering of the inks can cause a change in the resulting color.) Thus one can only delay the printing of an ink until the return pass if it should lie on top of any other inks also deposited for that pixel. Since the deposit order of the layers is to be the forward printing order (Y above M above C), on the return pass, Y can always be safely printed. The M ink can be printed provided there is no Y to be printed above it. The C can be printed only if there is neither Y nor M, and so on for all inks in the reverse order of printing. If any ink is guaranteed to never be overlaid with another ink (such as is usually the case for black ink) then it can be printed in the reverse pass irrespective of the other colors. The above example assumes that any pixels with all three separations C, M and Y set is replaced with one containing only K, as is believed done, e.g. in the Hewlett Packard HP500C. We call this process binary undercolor removal. Otherwise, the expression for K becomes $$K_{2LR} = K \wedge \neg(C \vee M \vee Y) \wedge X.$$

With reference now to the forward swath, processor 108 has as an input the four color signals C, M, Y, K and determines which colors may be printed in the forward transit based on the colors that will be printed on the return transit. In terms of printing colors in the right order, any pixels may be printed on the forward swath, so all pixels and separations that will not be printed on the return swath are printed on the forward swath. Generally, the logic arrangement has the function of an AND gate, with the signals from the return swath processor 110 inverted to generate an AND NOT response. An inverter 352 may be provided at the reverse swath input to and gate 350. Once again, supposing order KCMY is used for right-to-left printing on the printer, and C, M, Y and K are separation bitmaps representing the image $$K_{1RL} = K \wedge \neg K_{2LR}$$
$$C_{1RL} = C \wedge \neg C_{2LR}$$
$$M_{1RL} = M \wedge \neg M_{2LR}$$
$$Y_{1RL} = Y \wedge \neg Y_{2LR}$$

These expressions can be expressed more directly as $$K_{1RL} = K \wedge \neg X$$
$$C_{1RL} = C \wedge (M \vee Y) \vee \neg X$$
$$M_{1RL} = M \wedge (Y \vee \neg X)$$
$$Y_{1RL} = Y \wedge \neg X$$

The subscript RL emphasizes that the direction of transit is right to left. This result suggests that during the forward swath, all colors and pixels that have not been designated from printing in the return transit swath, will be printed.

It will be understood that the forward and reverse transit deposit requirements are essentially reversible. We have assumed in the example that the forward swath deposit order is the fixed order that is to be obtained. It should be clear that the reverse swath deposit order could also provide the fixed order, instead. What is required for the invention is that, in one swath, only colorants that can be deposited without concern for order are deposited, while in the other swath, the remaining colorants are deposited in the fixed order.

FIG. 4 illustrates the creation of the swath maps. The same example is assumed, with the forward transit printing in order KCMY. Accordingly, the return swath would print YMCK. The colors given in each box assume that the first letter represents a first layer to be deposited. Beginning with an original swath 300, it will be initially noted that due to undercolor removal, as far as colorants are concerned, there are only two colorants per pixel to be printed. Note that color is only deposited at a pixel location if order is irrelevant. Thus, since Y is the top or last layer printed, if the image has only yellow at a location, it is acceptable to print this layer in either transit, and therefore it can be printed in the reverse transit. With the same logic, the uppermost color in any two color combination can always be printed in the return swath, and accordingly the Y for YM or YC and the M for MC can be printed on the return swath. The remaining colors which are not suitably printed on the return swath are printed on the forward swath. The bitmap represented by signal X is also shown, to illustrate the logical ANDing function that causes that color selected to be printed on the return swath to be printed in the checkerboard pattern.

With respect now to FIG. 5, and as with normal unidirectional checkerboarding, half swath stepping down the sheet can be used to improve the uniformity further. Half swath stepping requires that half of the scanlines in a swath are swept first right to left, while the other half are first swept left to right. A given swath (which might have either direction of travel) will contain half new scanlines (the bottom half) and half scanlines that have been printed on the previous pass (in the top half). For those scanlines swept left to right first, the above expressions hold. For the remaining scanlines, at most 100% ink can be printed in a given pixel on the first pass (so separations are printed in the right order), while any amount can be printed on the second pass. The second pass is derived from the first and the original image in the same way as the first was derived from the second above. The first pass uses:

$$k_{1lr}=k \wedge x$$
$$c_{1lr}=c \wedge x$$
$$m_{1lr}=m \wedge \neg c \wedge x$$
$$y_{1lr}=y \wedge \neg (m \vee c) \wedge x;$$

Without undercolor removal this is:

$$k_{1lr}=k \wedge x$$
$$c_{1lr}=c \wedge \neg k \wedge x$$
$$m_{1lr}=m \wedge \neg (k \vee c) \wedge x$$
$$y_{1lr}=y \wedge \neg (k \vee m \vee c) \wedge x$$

(Alternatively one could use $\neg x$).
For the second pass, $$k_{2rf}=k \wedge \neg k_{1lr}$$
$$c_{2rf}=c \wedge \neg c_{1lr}$$
$$m_{2rf}=m \wedge \neg m_{1lr}$$
$$y_{2rf}=y \wedge \neg y_{1lr}$$

It will no doubt be appreciated that the invention can be accomplished with a hardware logic implementation thereof, or a software implementation on a programmable processing device, or a combination of hardware and software.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

What is claimed is:

1. A method for controlling an ink jet printer having a reciprocable printhead, controllable to print a swath of an image with a forward transit and a reverse transit across a sheet, printing each color pixel forming the swath on the sheet with a set of colorants deposited in a predetermined colorant deposit order defined by the forward transit, including the steps of:

a) receiving a set of colorant signals representing color pixels in a swath of the image;
   b) from the colorant signals, determining each colorant that may be deposited during the reverse transit while maintaining the predetermined colorant deposit order, and generating reverse transit signals indicative thereof;
   c) logically ANDing the reverse transit signals with a predetermined head signature mitigation signal to produce reverse transit print signals;
   d) determining from the colorant signals and the reverse transit print signals each colorant to be printed during the forward transit to complete printing the swath, and generating forward transit print signals indicative thereof;
   e) controlling the printhead to print a partial swath of the image with the forward transit print signals during the forward transit of the printhead across the sheet;
   f) controlling the printhead to print a complementary partial swath of the Image with the reverse transit colorant during the reverse transit of the printhead sheet.

2. A method as described in claim 1, wherein the colorant signals are cyan, magenta, yellow and black.

3. A method as defined in claim 1, wherein, prior to determining whether the colorants are deposited on the forward transit or reverse transit, the received colorants are processed for undercolor removal and black addition, so that each said color pixel is printed with at most two colorants, or black.

4. A method as described in claim 1, wherein the head signature mitigation signal is a checkerboard pattern.

5. A method as defined in claim 1, wherein for a set of colorants A, B, C and D printable during the forward transit, where colorants B, C and D are printed in the predetermined colorant deposit order as B-C-D, and where colorant A is never printed in combination with B, C or D colorants and is printed in any arbitrary position in the predetermined colorant deposit order B-C-D, the generated signals for the reverse transit are determined as follows:

$$B2LR = B \wedge \neg (C \vee D)$$
$$C2LR = C \wedge \neg D$$
$$D2LR = D$$

wherein 2LR refers to the reverse transit partial swath, $\wedge$, $\neg$ refers to the logical operations AND and NOT, respectively and $\vee$ refers to the logical operand OR.

6. The method as defined in claim 5, wherein for colorants A, B, C and D printable during the forward transit, wherein B, C, D are printed in the predetermined colorant deposit order B-C-D, and for A printed in any arbitrary position in said predetermined colorant deposit order, the generated signals for the reverse transit are further determined as follows:

$$A2LR = A.$$

7. A method as defined in claim 1, wherein for colorants A, B, C and D printable during the forward transit, where B, C and D are printed in the predetermined colorant deposit order given as B-C-D, and where colorant A is never printed in combination with any other colorant and printed in any arbitrary position in the order, and wherein the reverse transit partial swath has been determined in accordance with $$A2LR = A \wedge X$$
$$B2LR = B \wedge \neg (C \vee D) \wedge X$$
$$C2LR = C \wedge \neg D \wedge X$$
$$D2LR = D \wedge X$$

wherein 2LR refers to the reverse transit partial swath, $\wedge$, $\neg$ refers to the logical operations AND and NOT, respectively, $\vee$ refers to the logical operand OR and X refers to the predetermined head signature mitigation signal logically ANDed with the generated signal set, each forward transit colorant is determined in accordance with $$A1RL = A \wedge \neg A2LR$$
$$B1RL = B \wedge \neg B2LR$$
$$C1RL = C \wedge \neg C2LR$$
$$D1RL = D \wedge \neg D2LR$$

wherein 1LR refers to the forward transit partial swath.

8. A method as defined in claim 1, wherein for colorants A, B, C and D, where any of the colorants may be printed in combination with any other, printable during the forward transit in the predetermined colorant deposit order A-B-C-D, and wherein the reverse transit partial swath has been determined in accordance with $$A2LR = A \wedge \neg (B \vee C \vee D) X$$
$$B2LR = B \wedge \neg (C \vee D) \wedge X$$

$$C2LR = C \land \neg D \land X$$
$$D2LR = D \land X$$

wherein 2LR refers to the reverse transit partial swath, $\land$, $\neg$ refers to the logical operations AND and NOT, respectively, $\lor$ refers to the logical operand OR and X refers to the predetermined head signature mitigation signal logically ANDed with any generated signal set, each forward transit colorant are determined in accordance with $$A1RL = A \land \neg A2LR$$
$$B1RL = B \land \neg B2LR$$
$$C1RL = C \land \neg C2LR$$
$$D1RL = D \land \neg D2LR$$

wherein 1LR refers to the forward transit partial swath.

9. A method as defined in claim 1, including the step of:
providing relative movement between the sheet and the reciprocable printhead, to advance printing by an amount corresponding to about half of swath for each successive transit, whereby about half of the partial swath printed in the forward transit overlaps about half of the swath printed in the reverse transit.

10. A method as defined in claim 9, wherein for colorants A, B, C and D, printable during the forward transit in a predetermined colorant deposit order B-C-D, where colorant A is not printed in combination with B, C or D colorants and may be printed in any arbitrary position in the predetermined colorant deposit order, any portion of the reverse transit partial swath printed where the forward transit partial swath is printed first is determined by:

$$A2LR = A \land X$$
$$B2LR = B \land \neg(C \lor D) \land X$$
$$C2LR = C \land \neg D \land X$$
$$D2LR = D \land X$$

wherein 2LR refers to the reverse transit partial swath, $\land$, $\neg$ refers to the logical operations AND and NOT, respectively, $\lor$ refers to the logical operand OR and X refers to the predetermined head signature mitigation signal logically ANDed with the generated signal set;

that portion of the forward transit partial swath printed where no reverse transit partial swath is printed first is determined by:

$$A1RL = A \land \neg A2LR$$
$$B1RL = B \land \neg B2LR$$
$$C1RL = C \land \neg C2LR$$
$$D1RL = D \land \neg D2LR$$

wherein 1RL refers to the forward transit partial swath;

that portion of the forward transit partial swath printed where a reverse transit partial swath is printed first is been determined by:

$$A2RL = A \land X$$
$$B2RL = B \land X$$
$$C2RL = C \land \neg B \land X$$
$$D2RL = D \land \neg(C \lor B) \land X; \text{ and}$$

that portion of the reverse transit partial swath printed where no forward transit partial swath is printed first is determined by:

$$A1LR = A \land \neg A2RL$$
$$B1LR = B \land \neg B2RL$$
$$C1LR = C \land \neg C2RL$$
$$D1LR = D \land \neg D2RL.$$

11. A method as defined in claim 9, wherein for colorants A, B, C and D, each printable alone or in combination with any others, and printable during the forward transit in a predetermined order A-B-C-D, any portion of the reverse transit partial swath which is printed where a forward partial swath is printed first has been determined by:

$$A2LR = A \land \neg(B \lor C \lor D)X$$
$$B2LR = B \land \neg(C \lor D) \land X$$
$$C2LR = C \land \neg D \land X$$
$$D2LR = D \land X$$

wherein 2LR refers to the reverse transit partial swath, $\land$, $\neg$ refers to the logical operations AND and NOT, respectively, $\lor$ refers to the logical operand OR and X refers to the predetermined head signature mitigation signal logically ANDed with the generated signal set;

that portion of the forward transit partial swath printed where no reverse transit partial swath is printed first is determined by:

$$A1RL = A \land \neg A2LR$$
$$B1RL = B \land \neg B2LR$$
$$C1RL = C \land \neg C2LR$$
$$D1RL = D \land \neg D2LR$$

wherein 1RL refers to the forward transit partial swath;

that portion of the forward transit partial swath which is printed where a reverse transit partial swath is printed first is determined by:

$$A2RL = A \land X$$
$$B2RL = B \land \neg A \land X$$
$$C2RL = C \land \neg(B \lor A) \land X$$
$$D2RL = D \land \neg(C \lor B \lor A) \land X; \text{ and}$$

that portion of the reverse transit partial swath which is printed where no forward transit partial swath is printed first is been determined by:

$$A1LR = A \land \neg A2RL$$
$$B1LR = B \land \neg B2RL$$
$$C1LR = C \land \neg C2RL$$
$$D1LR = D \land \neg D2RL.$$

12. A color ink jet printer having a reciprocable printhead, controllable to print a swath of an image with a forward transit and a reverse transit across a sheet, printing each color pixel forming the swath on the sheet with a set of colorants deposited in predetermined colorant deposit order defined by the forward transit comprising:

a) a colorant signal input operatively connected to a source of colorant signals representing color pixels in a swath of the image;

b) reverse transit partial swath signal processing means responsive to the received colorant signals to determine each colorant that may be deposited during the reverse transit while maintaining the predetermined colorant deposit order, and generating reverse transit signals indicative thereof;

c) logic means for logically ANDing the reverse transit signals with a predetermined head signature mitigation signal to produce reverse transit print signals;

d) forward transit partial swath processing means responsive to the colorant signals and the reverse transit print signals, to determine each colorant to be printed during the forward transit to complete printing the swath, and generating forward transit print signals indicative thereof;

e) printer control means for controlling the printhead to print a partial swath of the image with the forward transit print signals during the forward transit of the printhead across the sheet and controlling the printhead to print a complementary partial swath of the image with the reverse transit print signals during the reverse transit of the sheet.

13. A device as defined in claim 12, wherein the colorant signals are cyan, magenta, yellow and black.

14. A device as defined in claim 12, wherein the head signature mitigation signal is a checkerboard pattern.

15. The device as defined in claim 12, wherein for a set of colorants A, B, C and D printable during the forward transit, in the predetermined colorant deposit order given as B-C-D, where colorant A is never printed in combination with B, C or D colorants and printed in any arbitrary position in the colorant deposit order, the generated signals for the reverse transit are determined as follows:

$$B2LR = B \wedge \neg (C \vee D)$$
$$C2LR = C \wedge \neg D$$
$$D2LR = D$$

wherein 2LR refers to the reverse transit partial swath, $\wedge$, $\neg$ refers to the logical operand AND NOT and $\vee$ refers to the logical operand OR.

16. The device as defined in claim 15, wherein for colorants A B, C and D, where colorant A is never printed in combination with B, C or D colorants, printable during the forward transit, the predetermined colorant deposit order is given as B-C-D, colorant A being printed in any arbitrary position in the order, the generated signals for the reverse transit are further determined as follows:

$$A2LR = A.$$

17. The device as defined in claim 12, wherein for colorants A, B, C and D printable during the forward transit, where B, C and D are printed in the predetermined colorant deposit order given as B-C-D, and where colorant A is never printed in combination with each other colorant and printed in any arbitrary position in the predetermined colorant deposit order, and wherein the reverse transit print signals are generated in accordance with $$A2LR = A \wedge X$$
$$B2LR = B \wedge \neg (C \vee D) \wedge X$$
$$C2LR = C \wedge \neg D \wedge X$$
$$D2LR = D \wedge X$$

wherein 2LR refers to the reverse transit partial swath, $\wedge$, $\neg$ refers to the logical operations AND and NOT, respectively, $\vee$ refers to the logical operand OR and X refers to the predetermined head signature mitigation signal logically ANDed with the generated signal set, the forward transit print signals are generated in accordance with $$A1RL = A \wedge \neg A2LR$$
$$B1RL = B \wedge \neg B2LR$$
$$C1RL = C \wedge \neg C2LR$$
$$D1RL = D \wedge \neg D2LR$$

wherein 1LR refers to the forward transit partial swath.

18. The device as defined in claim 12, wherein for colorants A, B, C and D, where any of the colorants may be printed in combination with any other, printable during the forward transit in a predetermined order A-B-C-D, and wherein the reverse transit print signals are generated in accordance with $$A2LR = A \wedge \neg (B \vee C \vee D) X$$
$$B2LR = B \wedge \neg (C \vee D) \wedge X$$
$$C2LR = C \wedge \neg D \wedge X$$
$$D2LR = D \wedge X$$

wherein 2LR refers to the reverse transit partial swath, $\wedge$, $\neg$ refers to the logical operations AND and NOT, respectively, $\vee$ refers to the logical operand OR and X refers to the predetermined head signature mitigation signal logically ANDed with the generated signal set, the forward transit print signals are generated in accordance with $$A1RL = A \wedge \neg A2LR$$
$$B1RL = B \wedge \neg B2LR$$
$$C1RL = C \wedge \neg C2LR$$
$$D1RL = D \wedge \neg D2LR$$

wherein 1LR refers to the forward transit partial swath.

19. The device as defined in claim 12, including:
means for providing relative movement between the sheet and the reciprocable printhead, to advance printing by an amount corresponding to about half of swath for each successive transit, whereby about half of the swath printed in the forward transit overlaps about half of the swath printed in the reverse transit.

20. A device as defined in claim 19, wherein for colorants A, B, C and D, printable during the forward transit in said predetermined order, where colorant A is not printed in combination with each other said colorant and may be printed in any arbitrary position in said predetermined order, said predetermined order being B-C-D, and where the reverse transit print signals for that portion of the reverse transit partial swath printed where a forward transit partial swath is printed first are generated in accordance with:

$$A2LR = A \wedge X$$
$$B2LR = B \wedge \neg (C \vee D) \wedge X$$
$$C2LR = C \wedge \neg D \wedge X$$
$$D2LR = D \wedge X$$

wherein 2LR refers to the reverse transit partial swath, $\wedge$, $\neg$ refers to the logical operations AND and NOT, respectively, $\vee$ refers to the logical operand OR and X refers to the predetermined head signature mitigation signal logically ANDed with the generated signal set;

the forward transit print signals for that portion of the forward transit partial swath printed where no reverse transit partial swath is printed are generated in accordance with:

$$A1RL = A \wedge \neg A2LR$$
$$B1RL = B \wedge \neg B2LR$$
$$C1RL = C \wedge \neg C2LR$$
$$D1RL = D \wedge \neg D2LR$$

wherein 1RL refers to the forward transit partial swath;

the forward transit print signals for that portion of the forward transit partial swath printed where a reverse transit partial swath is printed first are generated in accordance with:

$$A2RL = A \wedge X$$
$$B2RL = B \wedge X$$
$$C2RL = C \wedge \neg B \wedge X$$
$$D2RL = D \wedge \neg (C \vee B) \wedge X; \text{ and}$$

the reverse transit print signals for that portion of the reverse transit partial swath printed where no forward transit partial swath is printed first are generated in accordance with:

$$A1LR = A \wedge \neg A2RL$$
$$B1LR = B \wedge \neg B2RL$$
$$C1LR = C \wedge \neg C2RL$$
$$D1LR = D \wedge \neg D2RL.$$

21. The device as defined in claim 19, wherein for colorants A, B, C and D, each printable alone or in combination with any others and during the forward transit in a predetermined order A-B-C-D, the reverse transit print signals for that portion of the reverse transit partial swath printed where a forward transit partial swath is printed first are generated in accordance with:

$$A2LR = A \wedge \neg (B \vee C \neg D) X$$
$$B2LR = B \wedge \neg (C \vee D) \wedge X$$
$$C2LR = C \wedge \neg D \wedge X$$
$$D2LR = D \wedge X$$

wherein 2LR refers to the reverse transit partial swath, $\wedge \neg$ refers to the logical operations AND and NOT, respectively, $\vee$ refers to the logical operand OR and X refers to the predetermined head signature mitigation signal logically ANDed with the generated signal set;

the forward transit print signals, for that portion of the forward transit partial swath printed where no reverse transit partial swath, are generated in accordance with:

$$A1RL = A \wedge \neg A2LR$$
$$B1RL = B \wedge \neg B2LR$$
$$C1RL = C \wedge \neg C2LR$$
$$D1RL = D \wedge \neg D2LR$$

wherein 1RL refers to the forward transit partial swath;

the forward transit print signals for that portion of the forward transit partial swath printed where a reverse transit partial swath is printed first are generated in accordance with:

$$A2RL = A \wedge X$$
$$B2RL = B \wedge \neg A \vee X$$
$$C2RL = C \wedge \neg (B \vee A) \wedge X$$
$$D2RL = D \wedge \neg (C \vee B \vee A) \wedge X; \text{ and}$$

the reverse transit print signals for that portion of the reverse transit partial swath printed where no forward transit partial swath is printed first are generated in accordance with:

$$A1LR = A \wedge \neg A2RL$$
$$B1LR = B \wedge \neg B2RL$$
$$C1LR = C \wedge \neg C2RL$$
$$D1LR = D \wedge \neg D2RL.$$

22. The method as defined in claim 12, further comprising means operatively connected to the colorant signal input, and functionally arranged to operate on the colorant signals prior to determining whether the colorants are deposited on the forward transit or reverse transit, for processing received colorants signals for undercolor removal and black addition, so that each said color pixel is printed with at most two colorants, or black.

* * * * *